United States Patent

Calabro

[11] Patent Number: 5,376,415
[45] Date of Patent: Dec. 27, 1994

[54] REMOVABLE HOOD ORNAMENT

[75] Inventor: Anthony S. Calabro, Cranston, R.I.

[73] Assignee: Roger E. Landry, Jr., Tiverton, R.I.

[21] Appl. No.: 234,558

[22] Filed: Apr. 28, 1994

[51] Int. Cl.⁵ ............................................. B60R 13/04
[52] U.S. Cl. ........................................ 428/31; 40/591; 280/727
[58] Field of Search ............................ 428/31; 280/727; 40/591

[56] References Cited

U.S. PATENT DOCUMENTS

| | | | |
|---|---|---|---|
| 3,609,015 | 9/1971 | Messinger | 350/298 |
| 3,815,380 | 6/1974 | Esmay | 64/4 |
| 4,349,591 | 9/1982 | Kanamori | 428/31 |
| 4,459,785 | 7/1984 | Zimmer | 51/237 |
| 4,783,352 | 11/1988 | Kaiser, Jr. | 428/31 |
| 4,913,941 | 4/1990 | Tedrahn | 428/31 |
| 5,178,920 | 1/1993 | Stone | 428/31 |
| 5,262,210 | 11/1993 | Sellers et al. | 428/31 |

Primary Examiner—Alexander S. Thomas
Attorney, Agent, or Firm—Barlow & Barlow, Ltd.

[57] ABSTRACT

A removable and yieldable hood ornament apparatus which includes a compact structure for easy transportability is disclosed. The apparatus includes a base member with an ornament emblem mounted thereto, the base member includes a plurality of transversely protruding key members for receipt by a plurality of locking members positioned within a housing disposed below the surface of the automobile hood. A spring biased floor maintains the protruding key members in their respective locking members. The short base member is inserted into the housing below the hood of the automobile against the forces of the spring and then rotated along its longitudinal axis to effect locking. The forces of the spring maintain the apparatus in a locked condition.

11 Claims, 4 Drawing Sheets

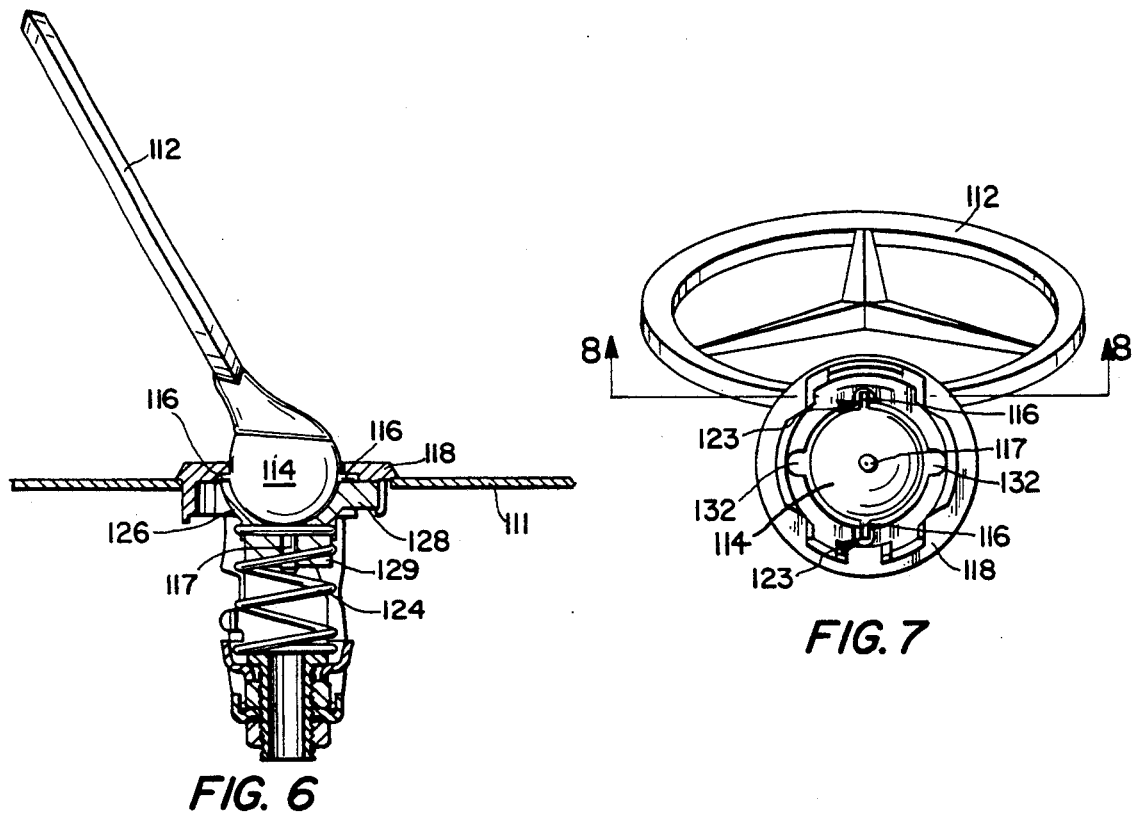
FIG. 6
FIG. 7
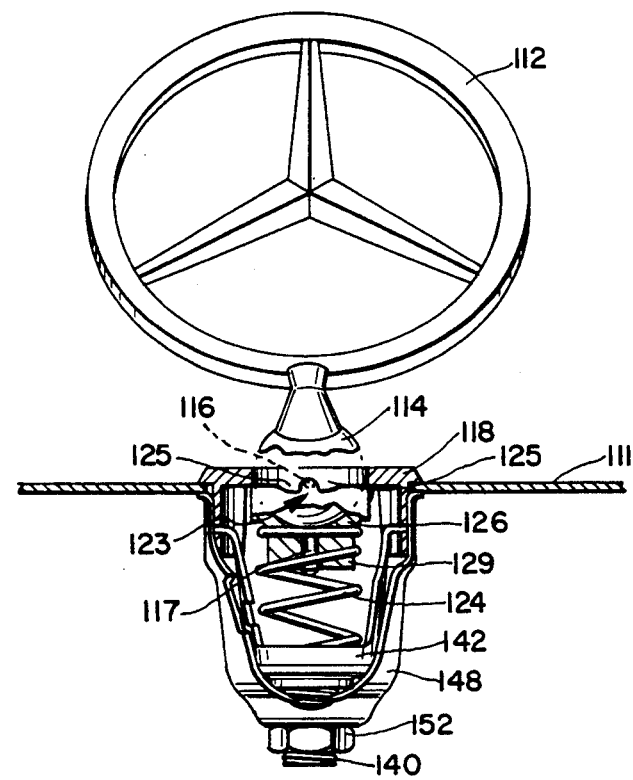
FIG. 8

REMOVABLE HOOD ORNAMENT

BACKGROUND OF THE INVENTION

The present invention relates generally to a removable hood ornament apparatus. More specifically relates to a removable hood ornament apparatus that permits the ornament member to be detached from the automobile hood to avoid damage, vandalism and theft.

In the automotive industry, it has been well known for manufacturers to include hood ornaments for identifying the make of the automobile as well as to improve the overall appearance of the automobile. However, the problem of damage and vandalism to and theft of these hood ornaments persists. As a result, there have been many attempts to provide a removable hood ornament in which the owner of the automobile may detach the hood ornament when desired.

For example, it has been known in the prior art to affix the hood ornament to a long shaft which may be inserted through the hood of the automobile for locking thereunder. Also, prior art apparatus have included retractable lock rods mounted within the support of the housing for the hood ornament to provide a quick release hood ornament. In addition to providing the ability to detach and reattach a hood ornament, attempts have been made to provide a hood ornament which is yieldable to various forces, such as automobile wash buffing pads, and contact with other automobiles. While the prior art includes hood ornament apparatus which provide either a mechanism for quick release and detachability, or, in the alternative, the capability of yielding to an outside force. A serious problem exists for known removable hood ornaments in that they, due to their structure, are incapable of yielding to an outside force. Such removable hood ornaments, once installed, are rigid members and create serious safety concerns in the event they are subject to an outside force.

In prior art hood ornaments, which are yieldable to outside forces, vandalism, theft and damage remains as a concern. Such yieldable hood ornaments are permanent installations into the hood of the automobile which require a complete reinstallation and often replacement of the entire hood ornament assembly in the event damage occurs. In the event of vandalism, which typically results in damage only to the ornament emblem itself, the stump of the ornament member will remain rendering the entire ornament apparatus useless. As a result, an entirely new hood ornament construction is required.

Due to the demand of a hood ornament which is both removable as well as yieldable to external forces, an automobile hood ornament apparatus which provides both such features is desired. Further, it is desirous for an automobile owner to have a hood ornament which is removable yet compact to facilitate transport. Such an apparatus should be easily replaceable even when only the emblem is stolen. Further, in the event of damage or theft, only the emblem should be required to be replaced as opposed to the entire hood ornament apparatus to reduce the overall cost of repair.

SUMMARY OF THE INVENTION

The present invention preserves the advantages of prior art hood ornament apparatuses. In addition, it provides new advantages not found in currently available hood ornament apparatuses, and overcomes many of the disadvantages of such currently available apparatuses. The invention is generally directed to a novel and unique removable and yieldable automobile hood ornament apparatus with particular application in replacing permanent and non-yieldable automobile hood ornaments. The removable and yieldable automobile hood ornament apparatus of the present invention enables the quick, simple and easy mounting of a hood ornament emblem to the hood of an automobile.

The preferred embodiment of the present invention includes a base member with an ornament mounted to the upper portion of the base member. On the base member are transversely protruding key members. Beneath the automobile hood, in the region of the hood ornament, a bracket member is mounted which includes a primary aperture therein with a number of slots for receiving the base member and the protruding key members. The bracket positioned below the automobile hood includes locking members for securing the key members in place thereby securing the base member to the hood of the automobile. A spring is mounted within the bracket member to maintain the key members in the locking arrangement. The key members are inserted into the locking means when the base member is inserted into the bracket member against the forces of the spring. The forces of the spring maintain the key members in the locking arrangement, thereby retaining the base member to the automobile hood.

For installation, the user inserts the base member, with ornament emblem connected thereto, into the bracket residing in an aperture in the hood of the automobile so that the base member's key members are aligned with the slots in the bracket member proximal to the surface of the automobile's hood. The key members are inserted into the slots and the base member is urged in a downward fashion to compress the spring from below. Upon compression of the spring, the base member is rotated along its longitudinal axis to cause the key members to enter into the locking arrangement. Upon release of the base member by the user, the key members are retained in place by the upward forces of the spring.

For removal, the base member is pressed in a downward direction against the forces of the spring to unseat the key members from the locking arrangement. The base member is then rotated in a direction along its longitudinal axis opposite to that during installation for aligning the key members with the slots in the bracket. Upon release of the base member, key members thereon are permitted to exit from the slots in the bracket to so the base member may detach from the bracket member installed on the hood of the automobile.

It is therefore an object of the present invention to provide a removable automobile hood ornament apparatus that may be operated simply and easily.

Another object of the present invention is to provide an automobile hood ornament apparatus that is both removable and yieldable to external forces.

It is a further object of the present invention to provide an automobile hood ornament apparatus that is compact and easily transportable.

It is yet a further object of the present invention to provide an automobile hood ornament apparatus that is easily replaceable in the event of damage, theft or vandalism.

BRIEF DESCRIPTION OF THE DRAWINGS

The novel features which are characteristic of the present invention are set forth in the appended claims.

However, the inventions preferred embodiments, together with further objects and attendant advantages, will be best understood by reference to the following detailed description taken in connection with the accompanying drawings in which:

FIG. 6 is a cross-sectional view through line 6—6 of FIG. 5;

FIG. 7 is a bottom view of the apparatus of the present invention showing the ornament in an installed and locked position; and FIG. 8 is a partial cross-sectional view through line 8—8 of FIG. 7.

DETAILED DESCRIPTION OF THE PREFERRED EMBODIMENT

Figure 1:
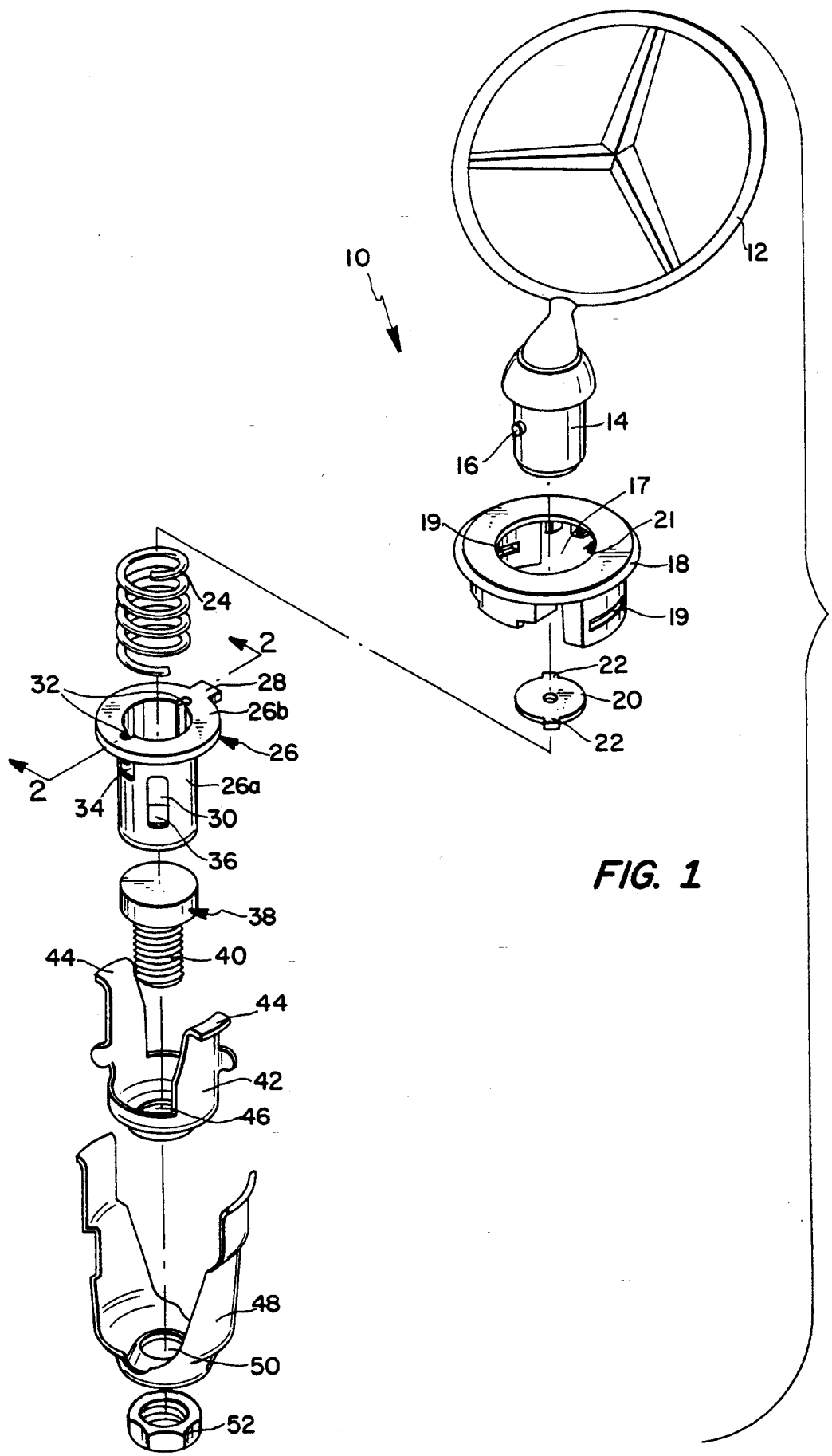
FIG. 1 is an exploded perspective view of the preferred embodiment of the automobile hood ornament apparatus of the present invention.

Referring to FIG. 1, in the preferred embodiment of the removable hood ornament apparatus of the present invention is generally shown as 10. Ornament emblem 12 is connected to base member 14 which is preferably cylindrical in shape. A pair of key members 16 transversely protrude from base member 14 approximately 180° from each other on base member 14. The relative locations of key member 16 can best be seen in FIG. 2.

Still referring to FIG. 1, a lower housing 26 is provided with a cylindrical portion 26a and an upper portion 26b for receiving coiled spring 24. Coiled spring 24 is sandwiched between lower housing floor 36 and movable lower plate 20. Lower plate 20 with locator tabs 22 is positioned within lower housing 26 with locator tabs 22 in longitudinal slots 30 with coiled spring 24 being positioned between lower plate 20 and lower housing floor 36. As a result, lower plate 20 forms a spring biased support floor with an upward and downward travel distance dictated by the length of longitudinal slots 30. Longitudinal slots 30 are provided approximately 180° from one another about the circumference of cylindrical portion 26a of lower housing 26.

Upper portion 26b of lower housing 26 includes housing key 28 for insertion into notch 21 on upper housing 18. Upper housing 18 provides a complimentary mate with upper portion 26b of lower housing 26b. Housing key 28 ensures that lower housing 26 does not rotate within upper housing 18. Upon upper housing 18 being mated with lower housing 26, aperture 17 will be coaxial with coiled spring 24 and lower housing 26.

Lower housing 26 further includes slots 32 for receiving key members 16 upon insertion of base member 14 into aperture 17. Positioned below slots 32 are locking notches 34 for receiving key member 16 upon base member 14 being pressed on lower plate 20 against the forces of coiled spring 24 to permit rotation along the longitudinal axis of base member 14 to lock key member 16 in locking notches 34.

Positioned below lower housing 26 is support plug 38 with male threading 40 thereon. Primary bracket 42 is installed over support plug 38 so threads 40 pass completely through aperture 46 in primary bracket 42. Bracket tabs 44 on primary bracket 42 are inserted into horizontal notches 19 on upper housing 18 to encase lower plate 20, coiled spring 24, lower housing 26 and support plug 38 therein. Secondary bracket 48 is mounted to the underside of primary bracket 42 with aperture 50 receiving the portion of threads 40 extending down through aperture 46. Threads 40 of support plug 38 extending down through aperture 50 receive female threaded nut 52 to secure the entire apparatus together. As a result, secondary bracket 48 secures and locks the apparatus to the hood 11 of an automobile as will be shown in greater detail below.

Figure 2:
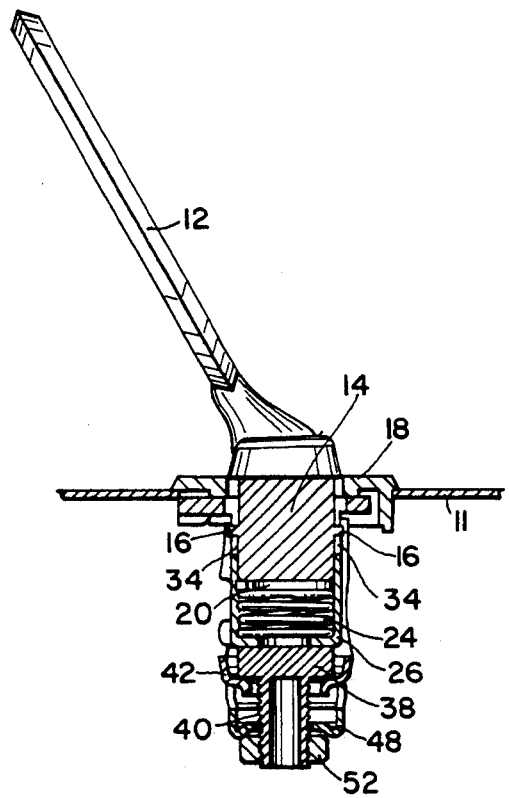
FIG. 2 is a cross-sectional view through the line 2—2 of FIG. 1 with the ornament installed and in a locked position.

In FIG. 2, a cross-sectional view through the line 2—2 in FIG. 1 is shown. FIG. 2 illustrates an assembled and installed condition of the removable hood ornament apparatus of the present invention. As can be seen, upper housing 18 is mounted to automobile hood 11. Key members 16 are positioned within locking notches 34 with spring biased lower plate 20 maintaining key members 16 in locking notches 34. Coiled spring 24 is in a compressed state when base member 14 is installed to maintain the apparatus in a locked position. Support plug 38 is shown below lower housing 26 with threads 40 passing through apertures and primary bracket 42 and secondary bracket 48 to threadably receive nut 52.

Figure 3:
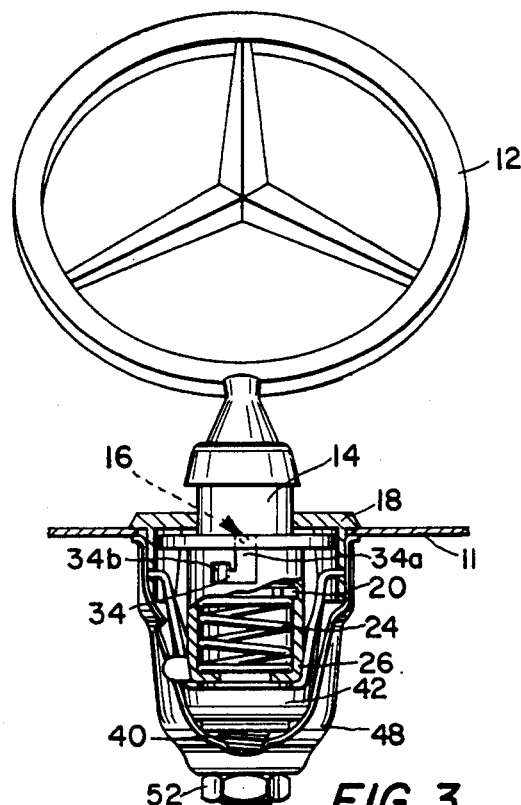
FIG. 3 is a side view of the apparatus of FIG. 1 showing the ornament partially installed.

FIG. 3 shows the preferred embodiment of the present invention in a partially installed state with key members 16 residing in slots 32, as seen in FIG. 1, in upper portion 26b of lower housing 26. In this state, lower plate 20 is being urged to its maximum height within lower housing 26, limited by longitudinal slots 30, as seen in FIG. 1. In the condition shown in FIG. 3, base member 14 has not been inserted enough to drop lower plate 20 below its maximum height against the forces of coiled spring 24. As stated above, it is preferred that two key members 16 be employed. For simplicity of discussion, only one side of the apparatus will described. The desired path of key member 16 to achieve locking is first downward into vertical notch portion 34a and then laterally to the left and then upwardly into notch seat portion 34b. The downward travel of key member 16 is against the forces of coiled spring 24. Upon positioned within notch seat portion 34b, the upward forces of lower plate 20 via coiled spring 24 maintains key member 16 in a locked state in notch seat portion 34b.

FIG. 3 also illustrates how the apparatus of the present invention is installed and secured to the hood 11 of an automobile. Lips 48a and 48b of secondary bracket 48 abut against the lower surface of hood 11. As a result, hood 11 is sandwiched between lips 48a and 48b and upper housing 18 to lock and secure the apparatus in place in hood 11.

Figure 4:
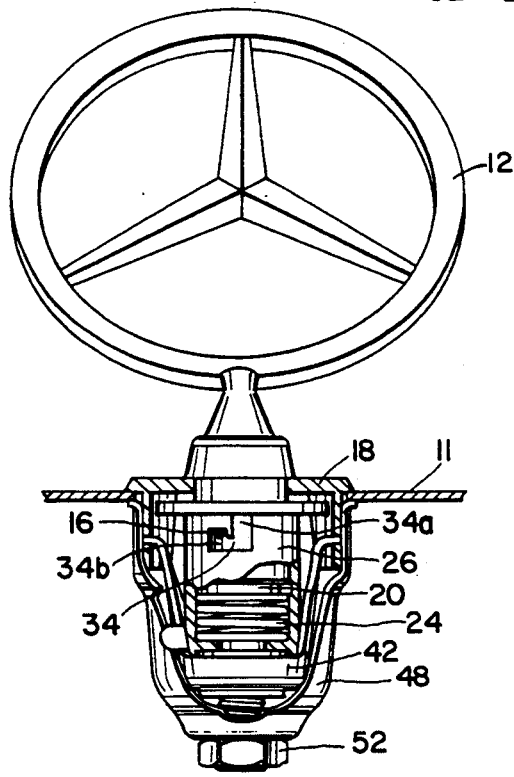
FIG. 4 is a side view of the apparatus of FIG. 1 showing the ornament fully installed and in a locked position.

The result of the foregoing installation is seen in FIG. 4. Base member 14 is pressed in a downward fashion against lower plate 20 against the forces of coiled spring 24 to move key member 16 down through vertical notch portion 34a. FIG. 4 illustrates the result of moving key member 16 laterally and upwardly into notch seat portion 34b. As can be seen, coiled spring 24 is compressed in FIG. 4 as compared to the non-installed state shown in FIG. 3. Still referring to FIG. 4, key member 16 remains seated within notch seat portion 34b until base member 14 is pressed downward to unseat key member 16, then rotated counterclockwise to remove key member 16 from seat 34b to permit removal through notch vertical portion 34a.

As a result of the foregoing construction, particularly the unique construction of the spring biased lower plate enables an extremely compact construction to be achieved. Particularly, due to the foregoing construction, base member 14 can be compact in structure without requiring a long shaft or complex structure. As a result of this compact structure, base member 14 with ornament emblem 12 connected thereto, can be easily removed, stored and transported.

FIGS. 5–8 illustrate an alternative embodiment of the removable hood ornament apparatus of the present invention. The apparatus 110 is generally shown to include an ornament emblem 112 connected to a preferably spherical base member 114 with transversely protruding key members 116. Further connected to, and depending downwardly from, base member 114 is locator shaft 117. A lower housing 126 is provided with a housing key 128 for insertion and mating with upper housing 118. Housing key 128 mates with notch 121 in upper housing 118 to prevent lower housing 126 from rotating within upper housing 118. When positioned underneath and within upper housing 118, lower housing 126 forms a cup shaped member for receipt of base member 114.

In particular, lower housing 126 includes hole 127 for receipt of locator shall 117 on base member 114. The cup shape of lower housing 126 substantially mates with the lower hemisphere of base member 114. Further, slots 132 in upper housing 118 provide a through path for key members 116.

Lower housing 126 includes a housing neck portion 129 for receipt of coiled spring 124 thereon. Below coiled spring 124, support plug 138 is provided with male threads 140 thereon. Threads 140 extend downward through aperture 146 in primary bracket 142 for fastening by nut 147. Additional threads 140 extending below nut 147 pass through aperture 150 in secondary bracket 148 for fastening by nut 152. Bracket tabs 144 engage with horizontal notches 119 in upper housing 118 to encase the structure together.

Figure 5:
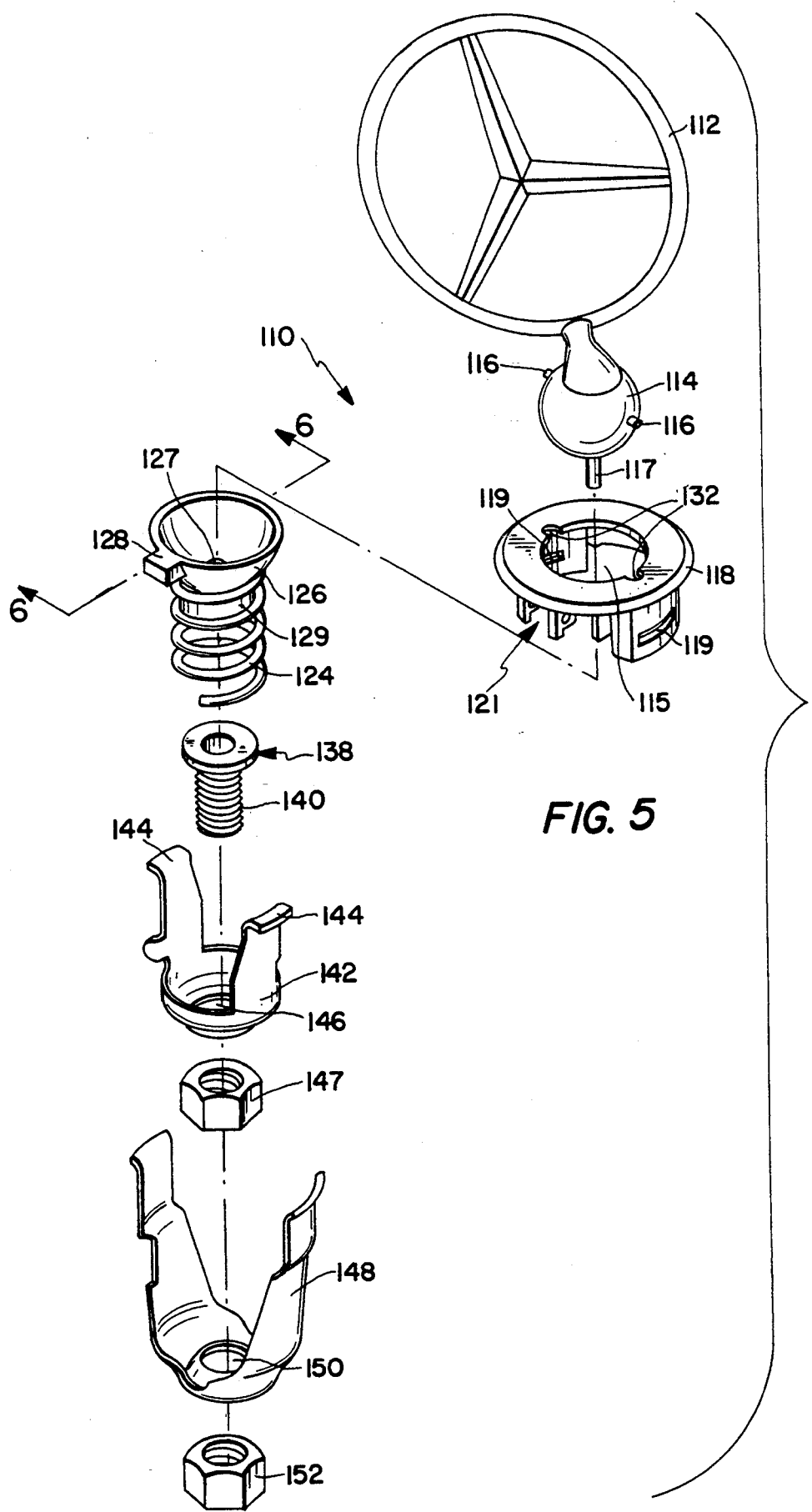
FIG. 5 is an exploded perspective view of an alternative embodiment of the automobile hood ornament apparatus of the present invention.

Turning now to FIG. 6, a cross-sectional view through lines 6—6 of FIG. 5 is shown to represent the alternative embodiment of the present invention in an installed condition. As can be seen, base member 114 communicates with lower housing 126 from a ball and socket-type mating. As shown in FIG. 6, key members 116 reside under upper housing 118 as a result of insertion into slots 132 and subsequent rotation along the longitudinal axis of locator shaft 117. Positioned about housing neck portion 129 is coiled spring 124 to retain an upward force urging lower housing 126 in an upward direction to bear on the lower hemisphere of base member 114 to lock key members 116 in place.

FIG. 7 shows a bottom view of base member 114 and upper housing 118 to illustrate the locking mechanism of this embodiment of the present invention. In FIG. 7, pass-through slots 132 are provided through upper housing 118. Upon installation, key members 116 simultaneously pass through slots 132. Base member 114 is rotated 90° about the longitudinal axis of locator shaft 117 to position key members 116 within locking seats 123. Locking seats 123 are partial cutouts on the lower surface of upper housing 118 and do not pass completely through upper housing 118 as do slots 132.

Further detail of the locking of key members 116 within locking seats 123 is shown in FIG. 8. Base member 114 is shown installed and in a locked position with key member 116 residing within locking seat 123 and retained in place by the upward forces of lower housing 126 via coiled spring 124. Lock ridges 125 are preferably provided on either side of locking seat 123 to prevent unintentional unseating of key member 116. Further, in the alternative, a lock seat arrangement may be provided on the upper surface of lower housing 126.

FIG. 8 also illustrates how the alternative embodiment of the present invention is installed and secured to hood 111. Lips 148a and 148b of secondary bracket 148 abut against the lower surface of hood 111. As a result, hood 111 is sandwiched between lips 148a and 148b and upper housing 118 to lock and secure the apparatus in place in hood 111.

In the installation of the alternative embodiment of the present invention, base member 114 with ornament emblem 112 connected thereto is inserted into aperture 115 of upper housing 118 so locator shaft 117 is inserted in hole 127 in lower housing 126. The lower hemisphere of base member 114 communicates with the cup-shaped lower housing 126. Key members 116 are aligned with slots 132. To achieve locking and complete installation, a downward force is applied to base member 114 to compress coiled spring 124. With spring 124 compressed, base member 114 is rotated approximately 90° along the longitudinal axis of locator shaft 117 to cause key members 116 to ride over lock ridges 125 to become seated within locking seats 123 on upper housing 118. The upper edge of cup-shaped lower housing 126 communicates with lock ridges 125 to completely contain key members 116 within their respective locking seats 123.

Separation of base member from the hood of an automobile in the alternative embodiment requires a downward force to be applied to base member 114 to unseat key members 116 from locking seats 123. Base member 114 is moved downwardly enough against the forces of coiled spring 124 so that key members 116 may clear lock ridges 125 upon subsequent rotation of base member 114 along the longitudinal axis of locator shaft 117. Upon clearance from lock ridges 125, key members 116 may be rotated underneath upper housing 118 for alignment with slots 132 for subsequent easy removal.

The ability for base member 114 to easily detach and lock to housing 118 and 126 is desired due to its removability. The unique construction of this alternative embodiment also provides a yieldable structure. Lower housing 126 is permitted lateral movement within upper housing 118. In the event emblem 112 is subject to an outside force, one or both key members 16 will lift off their seats because lower housing 126 provides a floating spring-biased floor which is capable of being rocked. As a result, an ornament, which is removable and lockable, as well as yieldable to outside forces, can be achieved.

In each of the embodiments disclosed above, each of the parts are preferably made of die-cast steel, or the like. A suitable ornament emblem 12 may be provided to correspond with the particular make of the automobile or, in the alternative, other fanciful ornaments may be provided. In each of the foregoing embodiments, a pair of transversely protruding key members have been provided for engagement with a respective pair of locking elements on the apparatus. The apparatus of the present invention may include only one protruding key member for engagement with a single locking means or, in the alternative, greater than two protruding key members and corresponding locking means may be provided to accommodate the desired application.

It would be appreciated by those skilled in the art that various changes and modifications can be made to the illustrated embodiments without departing from the spirit of the present invention. All such modifications and changes are intended to be covered by the appended claims.

What is claimed is:

1. A detachable ornament apparatus for an automobile hood having an aperture positioned therein for receipt of a portion of said ornament apparatus, comprising:

a base member;
an ornament mounted to the upper portion of said base member;
at least one transversely protruding key member affixed to said base member;
a bracket member including at least one slot for receiving said at least one key member; said bracket further including means for locking said at least one key member in place;
spring means mounted within said bracket member for maintaining said at least one key member in said locking means when said at least one key member is inserted into said locking means when said base member is inserted into said bracket member against the forces of said spring means; and
a housing within said bracket; said housing including a floor and an open top end and a side wall; said side wall having at least one substantially J-shaped locking means notch extending down from the open top end of the housing; said at least one J-shaped locking means being positioned to receive said at least one key member; each J-shaped locking means including an entry notch portion and a seat portion.

2. The apparatus of claim 1, wherein said base member is cylindrical.

3. The apparatus of claim 1, further comprising a lower plate having at least one locator tab; said lower plate positioned within said housing and parallel with said floor and being slidable within said housing along its longitudinal axis; said at least one locator tab being slidably positioned with at least one longitudinal aperture in the side wall in said housing.

4. The apparatus of claim 3, wherein said spring means is positioned between said floor and said lower plate to spring-bias said lower plate; the longitudinal travel of said lower plate being limited by the length of said at least one longitudinal aperture; whereby insertion of said base member into said housing with said at least one key member entering said entry notch portion of said J-shaped locking means in the side wall and into contact with said lower floor causes said lower floor to compress said spring means and move said lower floor downwardly against the forces of said spring means; subsequent rotation of said base member along its longitudinal axis positioning said at least one key member into said seat portion of said J-shaped locking means to lock said base member to said bracket member.

5. The apparatus of claim 1, wherein said base member includes two transversely protruding key members.

6. A detachable ornament apparatus for an automobile hood having an aperture positioned therein for receipt of a portion of said ornament apparatus, comprising:

a base member;
an ornament mounted to the upper portion of said base member;
at least one transversely protruding key member affixed to said base member;
a bracket member including at least one slot for receiving said at least one key member; said bracket further including means for locking said at least one key member in place;
spring means mounted within said bracket member for maintaining said at least one key member in said locking means when said at least one key member is inserted into said locking means when said base member is inserted into said bracket member against the forces of said spring means;
a mounting support having an upper surface and a lower surface affixed to said bracket member and said upper surface of said mounting support being flush with said automobile hood; said mounting support includes at least one slot and aperture for receipt of said base member and said at least one key member, when aligned therewith; and
a socket having an upper edge for receiving said base member upon insertion of said base member through said mounting support; said socket being mounted to said spring means to spring bias said socket relative to said mounting support and said bracket member; said upper edge of said socket being closely adjacent to said lower surface of said mounting support.

7. The apparatus of claim 6, further comprising:

a locking means for connecting said base member to said bracket member; said locking means including at least one seat groove positioned on said lower surface of said mounting support; whereby insertion of said base member into said mounting support with said at least one key members entering said at least one slot, said base member contacts said socket to compress said spring means to move said socket downwardly against the forces of said spring means; subsequent rotation of said base member within said socket along its longitudinal axis positioning said at least one key member into said locking means to lock said bracket member.

8. The apparatus of claim 7, wherein the lower surface of said mounting support immediately surrounding said at least one seat groove is raised relative to the remainder of the lower surface of said mounting support to provide a barrier about said at least one seat groove to impede entry and exit of said at least one key member into and out of said at least one seat groove.

9. The apparatus of claim 7, wherein said socket is substantially cup-shaped and positioned to receive said base member to provide a substantially complimentary mate with said base member.

10. The apparatus of claim 6, further comprising:

a pole means connected to the bottom of said base member for insertion into an aperture in said socket; said pole means being rotatable within said aperture.

11. The apparatus of claim 6, wherein said base member is substantially spherical in shape.

* * * * *